March 30, 1954  E. M. DURAND  2,673,741
FERTILIZER SPREADER
Filed Nov. 18, 1949  3 Sheets-Sheet 1
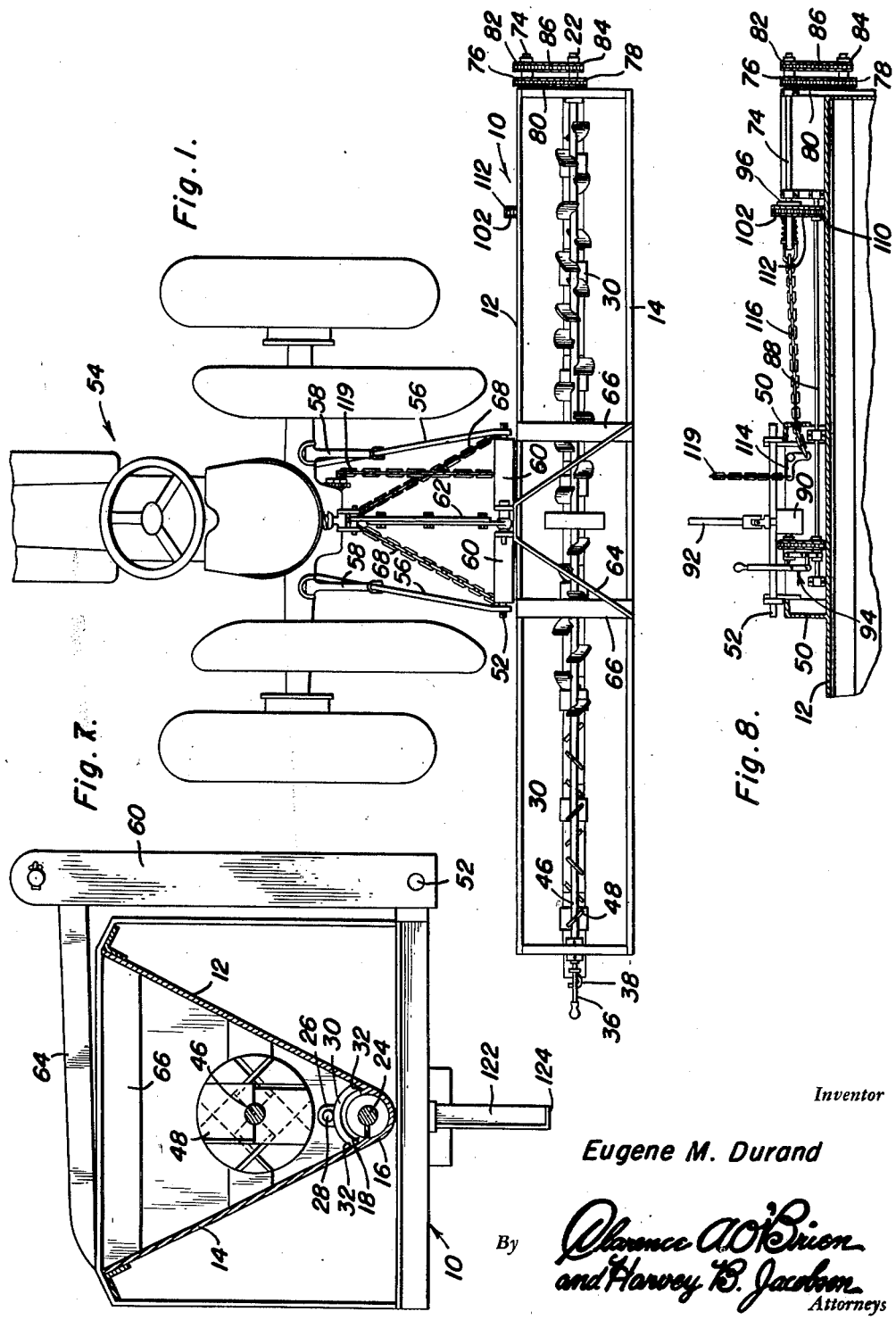
Inventor
Eugene M. Durand

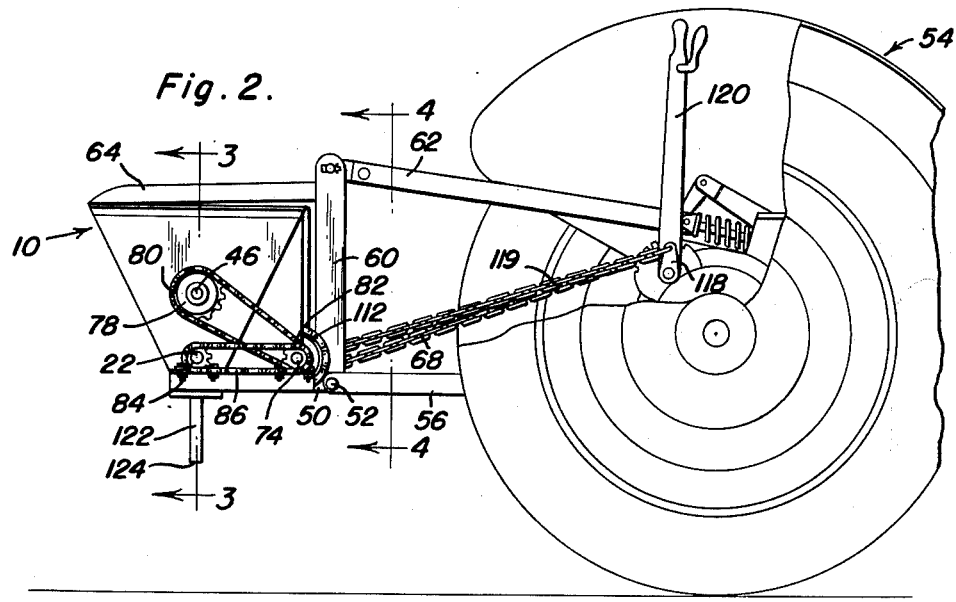
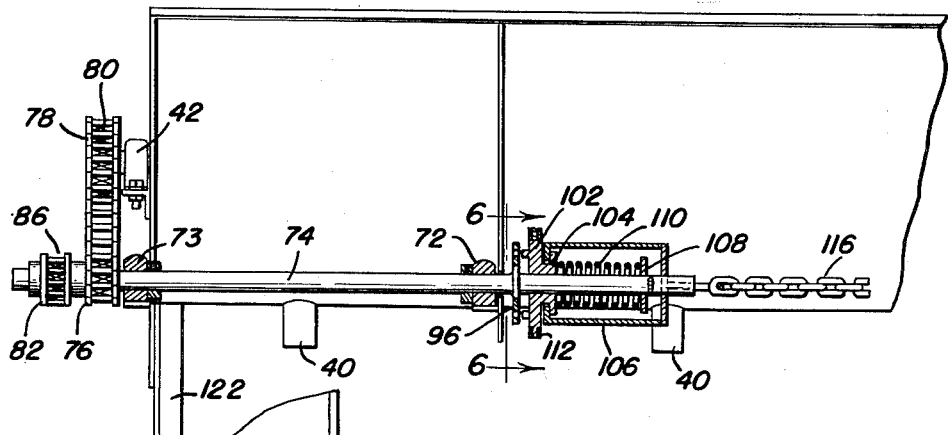

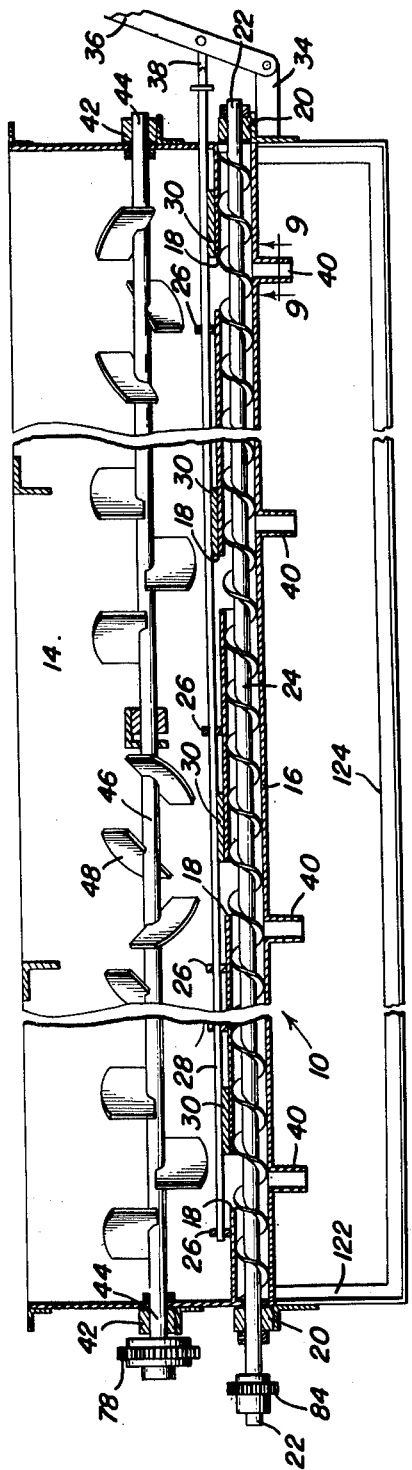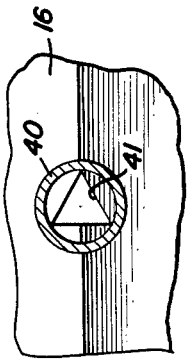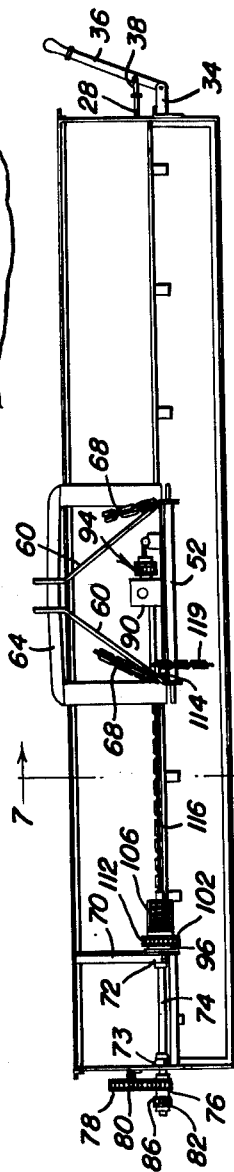
March 30, 1954 — E. M. DURAND — 2,673,741
FERTILIZER SPREADER
Filed Nov. 18, 1949 — 3 Sheets-Sheet 3
Fig. 3.
Fig. 9.
Fig. 4.
Inventor
Eugene M. Durand Patented Mar. 30, 1954

2,673,741

UNITED STATES PATENT OFFICE 2,673,741

FERTILIZER SPREADER

Eugene M. Durand, El Centro, Calif.

Application November 18, 1949, Serial No. 128,170

2 Claims. (Cl. 275—7)

This invention relates to new and useful improvements in fertilizer spreaders and the primary object of the present invention is to provide a fertilizer spreader including an agitator and a feed screw that are operatively connected to the power take-off shaft of a tractor so that as the tractor is moved over a strip of land relatively fine particles of fertilizer will be discharged and dispersed at the rear of the tractor.

Another important object of the present invention is to provide a fertilizer spreader including a hopper having discharge means and a manually operated valve construction for regulating the amount of fertilizer leaving the hopper through the discharge means.

A further object of the present invention is to provide a fertilizer spreader that includes a novel and improved mounting means for quickly and readily applying the spreader to a tractor.

A still further aim of the present invention is to provide a fertilizer spreader that is simple and practical in construction, strong and reliable in use, small and compact in structure, relatively inexpensive to manufacture and to operate, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary plan view of a tractor and showing the present invention applied thereto;

Figure 2 is an enlarged side elevational view of Figure 1 and with parts of the tractor broken away for the convenience of explanation;

Figure 3 is an enlarged vertical sectional view taken substantially on the plane of section line 3—3 of Figure 2;

Figure 4 is a front view of the hopper taken substantially on the plane of section line 4—4 of Figure 2;

Figure 5 is an enlarged fragmentary view of Figure 4 and with parts broken away and drawn in section to illustrate the clutch mechanism;

Figure 6 is an enlarged detail sectional view taken substantially on the plane of section line 6—6 of Figure 5;

Figure 7 is an enlarged vertical sectional view taken substantially on the plane of section line 7—7 of Figure 4;

Figure 8 is a detail horizontal sectional view showing the manner in which the agitator and the feed screw are connected to the power take-off shaft of the tractor;

Figure 9 is an enlarged horizontal sectional view taken substantially on the plane of section 9—9 of Figure 3.

Referring now to the drawings in detail, wherein for the purpose of illustration, there is disclosed a preferred embodiment of the present invention, the numeral 10 represents the hopper or trough including forward and rear downward converging walls 12 and 14. A tube 16 is fixed between the lower ends of the walls 12 and 14. The upper periphery of the tube 16 is provided with a plurality of longitudinally displaced inlet openings 18 that extend the entire distance between the lower ends of the walls 12 and 14.

Suitable bearings 20 are mounted at the ends of the tube 16 and rotatably support the ends 22 of a spiral feed screw 24. A plurality of longitudinally spaced guides or ears 26 rise from the tube 16 and slidably support a bar 28 to which there is secured a plurality of longitudinally displaced concavo-convexed plates or valve members 30. The side edges 32 of the plates 30 bear against the inner faces of the walls 12 and 14 to prevent rotation of the bar 28 and the plates 30 relative to the tube 16.

Pivoted to a bracket 34 mounted on one end wall of the hopper 10, is a lever 36 that receives a hook 38 at one end of the bar 28. As the lever 36 is moved toward the hopper 10, the plates 30 will be urged toward the inlet openings 18.

A group of discharge nipples or conduits 40 depend from the tube 16 and from triangular discharge openings 41 in the tube and constitute the sole means whereby fertilizer is discharged from the tube 16.

The end walls of the hopper 10 support bearings 42 that journally receive the ends 44 of a rod 46. A plurality of longitudinally and circumferentially spaced agitator plates 48 are fixed to the rod 46. All of the plates 48 are inclined relative to the rod 46 and the plates are also inclined relative to each other in order to obtain the most efficient agitating effect on fertilizer in the hopper.

A pair of arms 50 are fixed to and project forwardly of the wall 12. The arms 50 support a pivot pin 52 that is connected to the rear part of a tractor 54 by links 56. These links 56 are also connected to the lift arms 58 of the tractor so that the hopper may be raised and lowered.

Straps 60 are mounted on the pin 52 and an adjustable connecting member 62 is pivoted at its rear end to the upper ends of the straps 60.

The forward end of the member 62 is pivoted to the rear of the tractor. The upper ends of the straps 60 are secured to a substantially U-shaped member 64 whose leg portions are welded or otherwise fixed to the upper end of the wall 14 and to cross-members 66 joining the walls 12 and 14.

Chains 68 connect the pin 52 to the rear of the tractor and limit downward swinging movement of the hopper relative to the tractor.

A support plate 70 is fixed to and projects laterally from the wall 12. The plate 70 supports a bearing 72 that cooperates with a further bearing 73 on the wall 12 in rotatably holding a shaft 74.

The shaft 74 supports a sprocket 76 that is connected to a sprocket 78 on one end of the rod 46 by an endless chain 80. Another sprocket 82 on the shaft 74 is connected to a further sprocket 84 on one end of the screw shaft 22 by a sprocket chain 86.

A further shaft 88 is journaled in suitable bearings on the plate 70 and the arms 50. The shaft 88 is connected through reduction gearing 90 to the power take-off shaft 92 of the tractor. A suitable clutch mechanism 94 controls the drive to the shaft 88.

Means is provided for driving the shaft 74 by the shaft 88. This means comprises a first clutch plate 96 fixed to the shaft 74 and having a plurality of circumferentially spaced slots 98 for receiving a group of lugs 100 on the side face of a second clutch plate and sprocket 102 that is journaled on the shaft 74. A flanged collar 104 is fixed to the plate 102 and supports a cylindrical guard 106. A stop or abutment 108 is secured to the shaft 74 within the guard 106. A coil spring 109 embraces the shaft 74 and is biased between the stop 108 and the collar 104 to yieldingly urge the plate 102 toward the plate 96. A sprocket 110 is fixed on the shaft 88 and is connected to the sprocket 102 by an endless sprocket chain 112.

A horizontally swinging bell-crank lever 114 is pivoted on the hopper. One leg of lever 114 is connected to the guard 106 by a chain 116 whereas the other leg of the lever 114 is connected to a crank arm 118 by a chain 119. The crank arm 118 is mounted on a shaft that is rotated by a hand lever 120 in order to move the plate 102 relative to the plate 96. When the plate 102 is spaced from the plate 96, the plate 102 idles on the shaft 74 and the feed screw and the agitator fail to rotate. However, when the plate 102 is urged against the plate 96, the lugs 100 enter the slots 98 so that the shaft 74 will rotate with the shaft 88 and the feed screw and the agitator rotate.

The leg portions 122 of a substantially U-shaped angle iron frame-member 124 are secured to the end portions of the tube 16 and the web portion of the frame-member 124 is disposed longitudinally of the tube 16 and directly beneath the discharge tubes 40 to function as a means for scattering fertilizer passing through the discharge tubes.

Having described the invention, what is claimed as new is:

1. A fertilizer spreader comprising an elongated horizontal trough having a pair of elongated converging walls, a horizontally disposed tube mounted between and having a top merging with the walls and also having a plurality of inlet and outlet openings therein, agitating means mounted in the trough above the tube, a feed conveyor within the tube, and a plurality of longitudinally spaced guides extending upwardly from said tube, a bar paralleling said tube and slidably carried by said guides, concavo-convexed plates secured to said bar and slidably received on said tube for closing the inlet openings in said tube, and an elongated frame support for the trough and including means for attaching the trough to the rear of a tractor and transversely of the direction of translation of the tractor.

2. In a fertilizer spreader including a horizontally disposed feed screw accommodating tube having longitudinally spaced openings in its upper and lower walls, a feed screw disposed in said tube, means for driving said feed screw, a plurality of longitudinally spaced guides fixed to and extending upwardly from the upper periphery of said tube, a rod paralleling and overlying the tube and slidably received by the guides, a plurality of longitudinally spaced concavo-convex plates disposed under the rod and having their convex surfaces fixed to said rod, said plates conforming to the shape of the tube and being disposed over the tube with their concave surfaces contacting the upper periphery of said tube, and hand operated lever means operatively connected to one end of said rod for simultaneously moving the plates to selectively open and close the openings in the upper wall of the tube.

EUGENE M. DURAND.

References Cited in the file of this patent

UNITED STATES PATENTS

| Number | Name | Date |
|---|---|---|
| 534,750 | Kimball | Feb. 26, 1895 |
| 1,005,525 | Erich | Oct. 10, 1911 |
| 1,095,383 | Cole | May 5, 1914 |
| 1,181,930 | Sherwin | May 2, 1916 |
| 1,776,814 | Lutz | Sept. 30, 1930 |
| 1,947,379 | Cargill | Feb. 13, 1934 |
| 2,097,102 | Moore | Oct. 26, 1937 |
| 2,258,519 | Schumacher | Oct. 7, 1941 |
| 2,350,107 | Gandrud | May 30, 1944 |
| 2,369,755 | Rosselot | Feb. 20, 1945 |
| 2,400,646 | Klein | May 21, 1946 |
| 2,410,937 | Harder | Nov. 12, 1946 |
| 2,522,693 | Stiteler | Sept. 19, 1950 |